United States Patent
Cornelius et al.

[15] 3,669,904
[45] June 13, 1972

[54] PARTICLES FEATURING GAMMA ALUMINA

[72] Inventors: Edward B. Cornelius, Swarthmore, Pa.; David W. Koester, Wilmington, Del.

[73] Assignee: Air Products and Chemicals, Inc., Philadelphia, Pa.

[22] Filed: May 28, 1970

[21] Appl. No.: 41,632

[52] U.S. Cl. ................252/465, 252/463, 252/466 PT, 252/466 J, 252/466 B
[51] Int. Cl. ................B01j 11/06, B01j 11/08, B01j 11/32
[58] Field of Search................252/463, 466 J, 466 PT, 465, 252/466 B; 23/143

[56] References Cited

UNITED STATES PATENTS

| | | | |
|---|---|---|---|
| 3,189,563 | 6/1965 | Hauel | 252/477 R |
| 3,188,174 | 6/1965 | Kehl et al. | 252/463 X |
| 3,280,041 | 10/1966 | Michael | 252/466 PT |

*Primary Examiner*—Daniel E. Wyman
*Assistant Examiner*—W. J. Shine
*Attorney*—B. Max Klevit and J. R. Ewbank

[57] ABSTRACT

A propensity to form gummy mixtures with water is a troublesome characteristic of a technical grade of boehmite, said power comprising a total ignition loss of about 25 percent, a volatile alcohol content corresponding to less than 1 percent carbon, minor amounts of amorphous alumina and a major amount of alpha mono hydrate. A portion of the technical boehmite is mildly calcined at 400°–500° C. for at least 15 minutes to provide a dehydrated alumina powder, which then mixed with a significantly larger amount of the uncalcined technical grade of boehmite, can be mixed with water for providing a plastic mixture suitable for shaping into catalyst particles. The catalyst particles are calcined above about 600° C. for more than 1 hour in the presence of steam to form attrition resistant particles of gamma alumina having the pore size distribution desirable in certain types of catalysts.

3 Claims, No Drawings

PARTICLES FEATURING GAMMA ALUMINA

GENERAL BACKGROUND

Natural ores containing alumina alpha monohydrate, sometimes designated as boehmite, have been described. During the calcination of certain trihydrates and certain gels, intermediates having some of the X-ray diffraction lines of alumina alpha mono hydrate are formed. High purity alpha mono hydrate is best prepared without calcination. when amalgamated aluminum reacts with steam or water above about 95° c., alpha mono hydrate is formed. various hydrothermal treatments in an autoclave containing superheated water convert other products to alumina alpha mono hydrate at temperatures above about 95° c., desirably about 200° c. for a variety of reasons, hydrated crystalline alumina has been marketed almost exclusively as the trihydrate. Alumina alpha mono hydrate has been predominantly a laboratory curiosity. Although ores comprising boehmite have been sold, catalyst technologists have been told that purified boehmite was not a tonnage chemical in recent decades.

A new product on the market is a powder, sometimes designated as a technical grade of boehmite, which is a by-product from the manufacture of other chemicals, apparently using triethyl aluminum as an intermediate. Such by-product alumina has been remarkable by reason of the low content of sodium, ordinarily a troublesome impurity in alumina trihydrate. Said alumina powder undergoes about 25 percent total ignition loss, well above the 15 percent ignition loss of a pure mono hydrate, and well below the 34.7 percent ignition loss of a pure trihydrate. Moreover, the powder formation procedure assures the presence of predominantly boehmite, some amorphous alumina, and little trihydrate. Because the alumina is derived from a method comprising lower alkanols, a portion of the ignition loss concerns ethanol and related alkanols instead of water. The carbon content of the technical grade of boehmite is less than 1 percent. Various types of such technical grade of boehmite have various particle size distributions, but all are useful powders.

SUMMARY

Catalyst particles having a major amount of gamma alumina are prepared from precursor mixtures featuring a mixture of mildly calcined technical boehmite and a larger amount of raw (i.e., uncalcined) technical boehmite, the unit weight ratio of alumina content of raw to mildly calcined alumina being about 1.01 to 9. Such gamma alumina may be a matrix of a catalyst featuring at least one catalytically active transition metal component. The precursor mixture contains an extrusion modifier selected from the group consisting of thermally decomposable water soluble compound of catalytically active transition metals, nitric acid, polyalkylene flour, and mixtures thereof.

The invention is further clarified by reference to a plurality of examples.

EXAMPLE 1

Chemicals are prepared by the use of triethyl aluminum, and the alumina formed as a by-product is powdered and marketed as a technical grade of boehmite. A sample of the technical grade of boehmite is evaluated and found to be quite free from contaminants, containing less than 0.01 percent of any silica, iron oxide, sodium oxide, and sulfur. The small amount of volatile organic alcohol in the alumina is susceptible to removal during any test for total ignition loss or other elevated temperature treatment in the presence of air. The carbon content is significant but less than 1 percent. The ignition loss is essentially 25 percent of the hydrated alumina, greater than the 15 percent which would be found in perfect crystals of alumina alpha mono hydrate. X-ray examination establishes that alumina alpha mono hydrate is the most abundant crystalline species, and that amorphous alumina is also present in an amount accounting for substantially all of the alumina except the boehmite. The boehmite powder is free-flowing.

In a comparative test procedure, an attempt is made to prepare a batch of extruded catalyst particles as a control, using a mixture of water and said technical grade of boehmite. However, the viscosity characteristics of the mixture of water and the technical boehmite powder are such that the mixture becomes somewhat elastic and gummy when processed in a mixer, whereby attempts to prepare a precursor for the extruder were not successful.

In a second comparative test procedure, a blend of about 50 percent raw halloysite and 50 percent of said technical grade of boehmite is dry-blended, and then mixed with water in a Lancaster mixture. The product is extruded and the particles are found to have the general properties which would be expected from a support derived in part from halloysite and in part from a crystalline alumina.

In a third control, powdered polypropylene (an example of a polyalkylene flour) is employed as an extrusion modifier. A fresh mixture (no mulling) of the technical grade of boehmite, polypropylene flour corresponding to 7.5 percent of alumina content of the boehmite, and dilute nitric acid is supplied to the auger of an extruder. The extruded strands are sliced into pellets and the pellets are calcined at about 650° C. for four hours in 10 percent steam and 90 percent air. Thereafter the pellets are cooled to room temperature. The short pellets are about 1/16-inch diameter and have certain attractive properties, including high purity alumina and many micro-pores. However, the thus prepared pellets have a bulk density of 0.73 g/cc. the pellets have the important disadvantage of disintegrating when immersed in water or aqueous solutions. Hence, the pellets are not suitable for the manufacture of catalyst pellets by conventional impregnation of a catalytic component onto the alumina carrier. A significant portion of the total usage of alumina pellets is for the manufacture of catalyst by impregnation. The pore size distribution date, as measured by mercury porosimeter are shown in Table A.

TABLE A

| Pores having diameter greater than— | Cumulative pore volume, cc./g. | Marginal pore volume, cc./g. | Percent |
| --- | --- | --- | --- |
| 10,000 A | 0.02 | 0.02 | 4 |
| 1,000 A | 0.03 | 0.01 | 2 |
| 500 A | 0.04 | 0.01 | 2 |
| 200 A | 0.04 | 0.00 | 0 |
| 100 A | 0.35 | 0.31 | 62 |
| 20 A | 0.50 | 0.15 | 30 |
| Total | | 0.50 | |

The previously disclosed controls indicate some of the limitations restricting the use of the technical grade of boehmite. As an example of the present invention, 1,344 grams of the technical grade of boehmite (9.9 mols) are mildly calcined at 450° C. for one hour to prepare dehydrated alumina powder and the thus prepared powder is blended with 1,360 grams (10 mols) of the technical grade of boehmite having an ignition loss of 25 percent. The weight ratio of alumina content is about 1.01 raw to about 1 calcined alumina. This blend is mixed with 9 percent nitric acid and extruded through an auger type extruder to provide strands which are sliced into pellets. Particular attention is directed to the feature of extrudability of the composition and the difficulty in achieving alumina pellets by extrusion. catalyst production is attainable because nitric acid serves as the effective extrusion modifier in said composition. The pellets are calcined at 500° C. for 3 hours in the presence of a stream of steam. The pellets are cooled to ambient temperature and withdrawn from the calciner.

Measurements are made on the alumina support, that is the pellets derived from the calcination of the mixture of technical grade boehmite and mildly calcined alumina. The distribution of pore size in the pellets is satisfactory. Tests are conducted to determine the suitability of the alumina pellets for the manufacture of catalysts by impregnation of a catalytic component onto the alumina. Such impregnated catalyst pellets are satisfactory. The troublesome disadvantage of poor immersion resistance is overcome by the use of the mildly calcined technical grade boehmite in the precursor.

EXAMPLE 2

Alumina particles were prepared by a procedure resembling Example 1, except that the precursor contained polypropylene flour (an example of polyalkylene flour) corresponding to 10 percent of the calcined alumina pellets. Such polyalkylene flour serves as a supplemental modifier enhancing the extrudability of the precursor composition. During the calcination of the pellets, much of the polypropylene was converted to volatile decomposition products and the residue was burned, so that none of the polypropylene remained in the calcined particles. The cooled particles were not shattered by immersion. The pellets had a bulk density of 0.673 kg per liter. The pellets had a desirable distribution of pore size, as indicated in table B, the data being derived from measurements made with a mercury-type of porosimeter. It should be noted that the pellets have a small portion of pores smaller than 100 A., and a significant portion of macropores larger than 1,000 A., and accordingly the pellets offer advantages as a catalyst carrier.

TABLE B

| Pores having diameter greater than— | Cumulative pore volume, cc./g. | Marginal pore volume, cc./g. | Percent |
| --- | --- | --- | --- |
| 10,000 A | 0.10 | 0.10 | 16 |
| 1,000 A | 0.18 | 0.08 | 13 |
| 500 A | 0.18 | 0.00 | 0 |
| 200 A | 0.20 | 0.02 | 3 |
| 100 A | 0.55 | 0.35 | 60 |
| 20 A | 0.60 | 0.05 | 8 |

EXAMPLE 3

Gamma alumina pellets are prepared from a mixture in which mildly calcined technical boehmite corresponds to 40 percent of the alumina content and uncalcined technical boehmite provides 60 percent of the final alumina product. The unit ratio of uncalcined to mildly calcined technical boehmite is thus 1.5. The mixture contains polypropylene powder corresponding to 10 percent of the alumina content. The mixture is distinguishable from some examples by reason of the use of water without any nitric acid. The polypropylene powder by itself serves as the effective extrusion modifier for enhancing extrudability of said mixture. The composition is mixed and extruded as 1/16-inch diameter pellets. After calcination, the bulk density of the pellets is 0.59 kg/liter. The gamma alumina pellets have an advantageous combination of properties, including a high surface area and desirable sorptive characteristics.

EXAMPLES 4–6

A series of alumina pellets were prepared by blending, on the basis of alumina content, 10 percent polypropylene powder, dilute nitric acid and a mixture of uncalcined and mildly calcined technical grade boehmite. Extrudability is enhanced by the action of the mixture of polypropylene powder and nitric acid as extrusion modifiers. Properties of the pellets after dehydration in a stream of steam and nitrogen and then air calcination at 950° F. are shown.

TABLE C

| Example | 4 | 5 | 6 |
| --- | --- | --- | --- |
| Percentage of Alumina from Mildly Calcined Technical Boehmite | 45.4 | 40 | 20 |
| Unit Ratio of Uncalcined to mildly Calcined | 1.2 | 1.5 | 4 |
| bulk density kg./l. | 0.653 | 0.646 | 0.634 |
| Crushing Strength Pounds | 6.9 | 6.4 | 2.9 |
| Surface Area M²/g. | 161 | 162 | 164 |
| Pore Volume Data (by Mercury Penetration) Total cc/g in Pores greater than 19 Angstrom | 0.603 | 0.630 | 0.600 |
| 19–100 Angstroms | 0.273 | 0.300 | 0.360 |
| 100–600 Angstroms | 0.145 | 0.132 | 0.074 |
| 600–60,000 Angstroms | 0.172 | 0.187 | 0.152 |

By a series of tests it is established that the mildly calcined technical boehmite should constitute from about 10 percent to about 45.4 percent of the total alumina, or that the unit weight ratio of the alumina in the uncalcined technical boehmite to the alumina in the mildly calcined technical boehmite should be from about 1.2 to about 9.

EXAMPLE 7

A catalyst was prepared containing, on the basis of final alumina content, 10 percent polypropylene powder, about 49.7 mildly calcined and about 50.3 percent raw technical grade boehmite. The ratio is about 1.01 raw to about 1 calcined alumina. Sufficient nitric acid was employed in the mixture to provide a pH of 3 in the composition. Extrudability is enhanced by the action of the mixture of polypropylene powder and nitric acid as extrusion modifiers. The mixture was extruded and sliced to provide 1/16-inch diameter pellets, which were calcined and shown to have bulk density of 0.67 kg/l, a crushing strength of 6 pounds, and a surface area of 105 m²/g. The total of pores having a diameter of 19-100 A. was about 0.053 cc/g and the size range of 100–600 A. accounted for 0.366 cc/g and the large pores of from 100–60,000 A. diameter accounted for 0.535 cc/g. The specific volume of the pores in cc/100 cc was 24.5 for 100–600 A. diameter and 35.8 for the 100–60,000 A. diameter.

EXAMPLE 8

Gamma alumina pellets were prepared from a mixture containing, on the basis of the final calcined alumina, 10 percent polypropylene powder, 60 percent uncalcined technical grade boehmite and 40 percent mildly calcined technical grade boehmite. The calcined gamma alumina pellets were rehydrated by soaking in water for 8 hours at 60° C. and then impregnated with chloroplatinic acid to provide 0.6 percent platinum. Platinum is among the catalytically effective transitional metals which can be impregnated into a gamma alumina particle by the treatment with a solution of a compound of such metal. Such impregnation illustrates the generic step of treating a gamma alumina particle, as has been done in the prior art, with a solution of a compound of a catalytically effective transitional metal, and platinum is adequately illustrative of each of the 58 transition metals, which group of transitional metals are recognized as having catalytic characteristics distinguishable from the catalytic characteristics of other elements. The thus prepared reforming catalyst was then compared with a control in which all steps were the same except for the omission of the rehydration step. In heating the catalyst to the temperature for conversion of methyl cyclopentane to benzene, the catalyst inherently undergoes calcination. Both catalysts were tested by the methylcyclopentane procedure with the following results.

TABLE E

| | Control | | Rehydrated | |
| --- | --- | --- | --- | --- |
| | fresh | regenerated | fresh | regenerated |

| Conversion % | 30.2 | 28.1 | 30.1 | 28.2 |
| --- | --- | --- | --- | --- |
| Methyl-Cyclopentene | 22.1 | 19.6 | 19.4 | 18.5 |
| Benzene | 5.7 | 6.0 | 8.1 | 7.7 |

The data indicated that the rehydration enhanced the acid activity of the gamma alumina and increased the benzene yield at the test conditions.

EXAMPLE 9

Technical grade boehmite having a moisture content of about 25 percent was mildly calcined. Such calcined alumina provided about 40 percent of the alumina in a mixture with 60 percent uncalcined, technical grade boehmite. The mixture contained polypropylene powder having an average particle size of about 35 microns and the polypropylene powder constituted about 10 percent of the weight of the alumina in the gamma alumina pellets. The polypropylene powder serves as the extrusion modifier. The mixture was extruded, sliced into pellets, and calcined at 950° F. for 1 hour. The gamma alumina pellets were impregnated with chloroplatinic acid and treated with hydrogen to provide a reforming catalyst containing 0.6 percent by weight platinum. The catalyst had a bulk density of 0.67 kg/liter which provided a platinum loading factor of 0.40 gram of platinum per 100 cc of catalyst. The crushing strength of the catalyst was 6.7 pounds. When the fresh catalyst was evaluated on the methyl cyclopentane screening test for 40 minutes, it was noted that there was 30.2 percent conversion to produce 22.1 percent methyl cyclopentenes and 4.7 percent benzene. After the catalyst had been regenerated, the MCP screening test provided a conversion of 28.1 percent, a yield of methylcyclopentenes of 19.6 percent and benzene formation of 6 percent. Such results were indicative that the reforming catalyst was sufficiently active and selective to be considered for commercial reforming operations.

The catalyst of this Example was subjected to accelerated aging by processing of naphtha hydrocarbon at a space velocity of 15 volumes of naphtha per volume of catalyst per hour, with a hydrogen to naphtha mol ratio of 6 and at 250 psig using a bronze block reactor. The platinum loading factor corresponded to 0.40 grams of platinum per 100 cc of catalyst. The reforming was conducted at 960° F. and the estimated initial octane number was 84.9 and the observed deactivation rate corresponded to a decline of octane number of 3.1 per barrel per pound. This low deactivation rate was more attractive than the deactivation rate of some catalysts which have been marketed as reforming catalysts. In heating the catalyst to 960° F for the reforming reaction, the catalyst inherently undergoes calcination.

EXAMPLE 10

A series of cobalt molybdate catalysts containing 15 percent molybdena and 3 percent cobalt oxide on gamma alumina were prepared by extrusion of a mixture in which there were proportions corresponding to 40 percent mildly calcined technical grade boehmite and 60% uncalcined technical grade boehmite, ammonium molybdate and cobalt nitrate solution. The extrudability of said mixture was enhanced because the solutions of cobalt nitrate and ammonium molybdate were extrusion modifiers. The bulk density of the catalyst was 0.85 kg/l and its crushing strength was 5.1 pounds. The catalyst was treated in a mixture of H$_2$ and H$_2$S to partially sulfide the catalyst. When employed for hydrogenative desulfurization, it removed 62.9 percent of the sulfur in a gas oil containing 1.05 percent sulfur, and had a greater effectiveness as a desulfurization catalyst than some desulfurization catalysts.

EXAMPLE 11

A cobalt molybdate catalyst was prepared by dry-blending 30 percent mildly calcined technical grade boehmite and 70 percent uncalcined technical grade boehmite plus polypropylene powder corresponding to 7.5 percent of the alumina. The amount of ammonium molybdate corresponded to 12 percent molybdena in the final catalyst and the cobalt nitrate and nickel nitrate were employed in concentrations providing 1.33 percent cobalt oxide and 0.67 percent nickel oxide in the final catalyst. The extrusion modifiers were the mixture of the solutions of the transitional metal compounds (ammonium molybdate, cobalt nitrate, and nickel nitrate) and polypropylene powder. The wet mixture was extruded, sliced, and the pellets calcined at 1,100° F. for 1 hour. The particles were given an artificial aging by treatment with a mixture of hydrogen and steam at 1,350° F. The catalyst was reoxidized at 950° F. Some of the properties of the catalyst were; pellet diameter 1/16 inch; bulk density, 0.72 kg/l; crushing strength 2,18 kg; surface area, 126 m$^2$/g; pore volume data; greater than 600 Angstrom diameter 0.39 cc/g; 100 to 600 Angstrom diameter 21.7 percent; 100–60,000 A. diameter 32.1 percent. The catalyst had an advantageous combination of properties, and appeared to have commercial advantages over some varieties of cobalt molybdate catalysts which have been marketed.

EXAMPLE 12

A cobalt molybdate catalyst was prepared from a mixture of mildly calcined technical grade boehmite (40 percent of alumina in the final catalyst) and uncalcined technical grade boehmite. The mixture of alumina and ammonium molybdate powder were mixed with aqueous cobalt nitrate solution and then modified by additional nitric acid acting as a plasticizing agent. The aqueous cobalt nitrate and nitric acid were extrusion modifiers. The mixture was extruded, sliced, and the pellets were calcined at 950° F. for several hours. The pellets had a density of 0.86 kg/l and a crushing strength of 6.8 pounds. The cobalt molybdate on alumina catalyst pellets were effective in desulfurization of gas oil.

EXAMPLE 13

A series of cobalt molybdate on gamma alumina catalysts were prepared by admixing mildly calcined technical grade boehmite; uncalcined technical grade boehmite; ammonium molybdate powder; cobalt nitrate solution; and water. No polypropylene powder was employed. The cobalt nitrate solution was the extrusion modifier. The proportions of mildly calcined to the total alumina were from one-sixteenth to one-half. In some cases, nitric acid was included in the mixture. The mixed ingredients were directed to an extruder and extruded into cylindrical strands, which were cut into cylindrical pellets. These pellets were heat-treated at about 950° F. in air, thus volatilizing the ammonia, ammonium nitrate, and water. The calcined catalyst contained 15 percent by weight of molybdena and 3 percent by weight of cobalt oxide. The pellet diameter was about one-sixteenth inch. The catalyst pellets were effective in hydrogenative desulfurization of gas oil.

EXAMPLE 14

A series of catalysts were prepared having 15 percent molybdenum oxide and 3 percent Group VIII oxide (nickel or cobalt) on alumina. In each case a mixture of 40 percent of mildly calcined and 60 percent uncalcined technical grade boehmite having an ignition loss of 25 percent was employed. The molybdena was introduced as 85 percent molybdic acid. The cobalt oxide or nickel oxide was introduced as a nitrate solution in the precursor before extrusion. The aqueous solution of the transitional metal nitrate (nickel and cobalt illustrating the 58 transitional metals having catalytic characteristics traditionally distinguished from the catalytic characteristics of other elements) was the extrusion modifier. In one preparation, powdered polypropylene having an average particle diameter of about 35 microns was employed as an extrusion aid, the quantity being about 6 percent of the calcined catalyst. Some of the data pertinent to these catalysts are:

TABLE F

| Code | Pellet diameter in inches | Crushing strength in pounds | Bulk density, kg/l. |
|------|---------------------------|------------------------------|---------------------|
| A    | 1/16                      | 6.6                          | 0.887               |
| B    | 1/8                       | 15.5                         | 0.929               |
| C    | 1/16                      | 3.8                          | 0.820               |
| D    | 1/16                      | 5.9                          | 0.862               |

Sample C included the polypropylene extrusion aide and Sample D utilized 3 percent nickel oxide instead of 3 percent cobalt oxide.

Performance tests in connection with these catalysts indicated that each had an attractive combination of activity, selectivity, and stability.

The invention claimed is:

1. In the method of preparing catalytic particles having a major amount of gamma sorptive alumina by calcination of precursor particles comprising water and hydrated alumina, the improvement which consists of;

preparing powdery particles of technical grade boehmite comprising alpha monohydrate as the predominant crystalline species and amorphous alumina, said particles having an ignition loss of about 25 percent and a propensity to form gummy mixtures with water;

calcining a portion of the technical grade boehmite at a temperature within a range from about 400° C. to about 500° C. for at least 15 minutes to provide small particle size, mildly calcined alumina;

preparing a precursor mixture consisting essentially of water, extrusion modifier selected from the group consisting of thermally decomposable water soluble compound of catalytically active transition metals, nitric acid, polyalkylene flour, and mixtures thereof, said uncalcined technical grade boehmite, and said mildly calcined alumina, the unit weight ratio of uncalcined alumina to mildly calcined alumina being from about 1.01 to about 9, said catalytically active transition metal being selected from the group consisting of nickel, molybdenum, platinum, and cobalt;

preparing particles from said precursor mixture;

calcining the particles at about 600° C. in a gas stream to form attrition resistant particles consisting predominantly of gamma sorptive alumina; and cooling and withdrawing as the product of the process the calcined particles.

2. The method of claim 1 in which an aqueous solution of a compound of platinum is impregnated into the gamma alumina particles.

3. The method of claim 2 in which chloroplatinic acid is impregnated into the gamma alumina particles.

* * * * *

PO-1050
(5/69)

UNITED STATES PATENT OFFICE
CERTIFICATE OF CORRECTION

Patent No. _____3,569,904_____ Dated _June 13, 1972_

Inventor(s) __Edward B. Cornelius and David W. Koester__

It is certified that error appears in the above-identified patent and that said Letters Patent are hereby corrected as shown below:

Column 2, line 64  "catalyst" should read --Catalyst--

Column 5, line 32  "4.7 percent benzene" should read --5.7 percent benzene--

Column 6, line 48  "one-sixteenth" should read --one-sixth--

Column 6, line 57  "one-sixteenth" should read --one-sixth--

Column 7, line 1  "about 6 percent" should read --about 5 percent--

Column 7, line 23  "consists of;" should read --consists of:--

Signed and sealed this 19th day of February 1974.

(SEAL)
Attest:

EDWARD M. FLETCHER, JR.
Attesting Officer

C. MARSHALL DANN
Commissioner of Patents